(12) United States Patent
Capper et al.

(10) Patent No.: US 11,140,974 B1
(45) Date of Patent: Oct. 12, 2021

(54) ISOLATED PIVOTING BAR-OSCILLATING TOOTH BRUSH WITH DENTA-HAPTIC FEEDBACK

(71) Applicants: David G. Capper, Novato, CA (US); Andrew S. Filo, Cupertino, CA (US)

(72) Inventors: David G. Capper, Novato, CA (US); Andrew S. Filo, Cupertino, CA (US)

(73) Assignee: Appcessories LLC, Novato, CA (US)

( * ) Notice: Subject to any disclaimer, the term of this patent is extended or adjusted under 35 U.S.C. 154(b) by 174 days.

(21) Appl. No.: 16/372,200

(22) Filed: Apr. 1, 2019

Related U.S. Application Data

(60) Provisional application No. 62/650,936, filed on Mar. 30, 2018.

(51) Int. Cl.
*A46B 15/00* (2006.01)
*A61C 17/34* (2006.01)
*A61C 17/22* (2006.01)

(52) U.S. Cl.
CPC ........ *A46B 15/0006* (2013.01); *A46B 15/004* (2013.01); *A46B 15/0044* (2013.01);
(Continued)

(58) Field of Classification Search
CPC .............. A46B 15/0006; A46B 15/004; A46B 15/0044; A46B 15/0046; A61C 17/221; A61C 17/3481
See application file for complete search history.

(56) References Cited

U.S. PATENT DOCUMENTS

| | | |
|---|---|---|
| 4,450,599 A | 5/1984 | Scheller |
| 4,476,604 A | 10/1984 | White |

(Continued)

FOREIGN PATENT DOCUMENTS

| | | | |
|---|---|---|---|
| CA | 2232528 | * | 9/1999 |
| CA | 2232528 A1 | | 9/1999 |
| DE | 19506129 A1 | * | 8/1996 |
| JP | 07236519 A | * | 9/1995 |
| JP | 407236519 A | | 9/1995 |
| JP | 09322824 A | * | 12/1997 |

(Continued)

OTHER PUBLICATIONS

Non-Final Office Action dated Dec. 9, 2015, U.S. Appl. No. 14/628,133, filed: Feb. 20, 2015, Applicant: Andrew S. Filo, 6 pages.

(Continued)

*Primary Examiner* — Randall E Chin
(74) *Attorney, Agent, or Firm* — Haverstock & Owens LLP

(57) ABSTRACT

A method of monitoring brushing of a tooth and gum surface includes sensing a brushing relative to the tooth surface during a brushing session and generating feedback in response to the brushing. In one embodiment, feedback is generated when a user, such as a child, starts brushing. In another embodiment, feedback is generated when the brushing technique deviates from a correct brushing technique, such as the Bass Technique. When a user uses a correct brushing technique, the bristles on the brush head of a tooth brush vibrate. When the user uses an incorrect brushing technique, the vibrations stop, alerting the user that her technique is incorrect. The user can be alerted about improper brushing techniques in other ways, such as by generating audible sounds such as chirps, interrupting audio signals such as music, generating flashing lights, or the like. Preferably, a user's brushing technique can be tracked for later evaluation.

29 Claims, 6 Drawing Sheets

(52) U.S. Cl.
CPC ........ *A61C 17/221* (2013.01); *A61C 17/3481* (2013.01); *A46B 2200/1066* (2013.01)

(56) References Cited

U.S. PATENT DOCUMENTS

| | | | |
|---|---|---|---|
| 5,282,291 | A | 2/1994 | Spieler |
| 5,331,707 | A | 7/1994 | Irizarry |
| 6,397,424 | B1 | 6/2002 | Leung |
| 8,544,131 | B2 | 10/2013 | Braun |
| 8,832,895 | B2 | 9/2014 | Jungnickel et al. |
| 9,462,878 | B1 * | 10/2016 | Filo ...................... A46B 15/004 |
| 2004/0000017 | A1 | 1/2004 | Kumagai |
| 2004/0187889 | A1 | 9/2004 | Kemp et al. |
| 2005/0066461 | A1 | 3/2005 | Chang |
| 2005/0108841 | A1 | 5/2005 | Edwards |
| 2007/0261185 | A1 | 11/2007 | Guney |
| 2007/0270221 | A1 | 11/2007 | Park |
| 2008/0196185 | A1 * | 8/2008 | Gatzemeyer ....... A61C 17/3481 15/23 |
| 2009/0085724 | A1 | 4/2009 | Naressi |
| 2009/0092955 | A1 * | 4/2009 | Hwang ................ A61C 17/221 434/263 |
| 2009/0320227 | A1 * | 12/2009 | Cohen .................... G04F 1/005 15/167.1 |
| 2012/0040758 | A1 | 2/2012 | Hosverth |
| 2012/0198640 | A1 | 8/2012 | Jungnickel |
| 2013/0239104 | A1 | 9/2013 | Savant et al. |
| 2014/0066209 | A1 | 3/2014 | Annambhotla |
| 2015/0351883 | A1 * | 12/2015 | Hwang ................ A61C 17/221 15/22.1 |
| 2018/0160796 | A1 * | 6/2018 | Jeanne ............... A46B 15/0012 |
| 2020/0390228 | A1 * | 12/2020 | Farrell .................. A61C 17/34 |

FOREIGN PATENT DOCUMENTS

| | | | |
|---|---|---|---|
| JP | 409322824 A | | 12/1997 |
| JP | 2004105246 A | * | 4/2004 |

OTHER PUBLICATIONS

Final Office Action dated Apr. 11, 2016, U.S. Appl. No. 14/628,133, filed: Feb. 20, 2015, 6 pages.

* cited by examiner

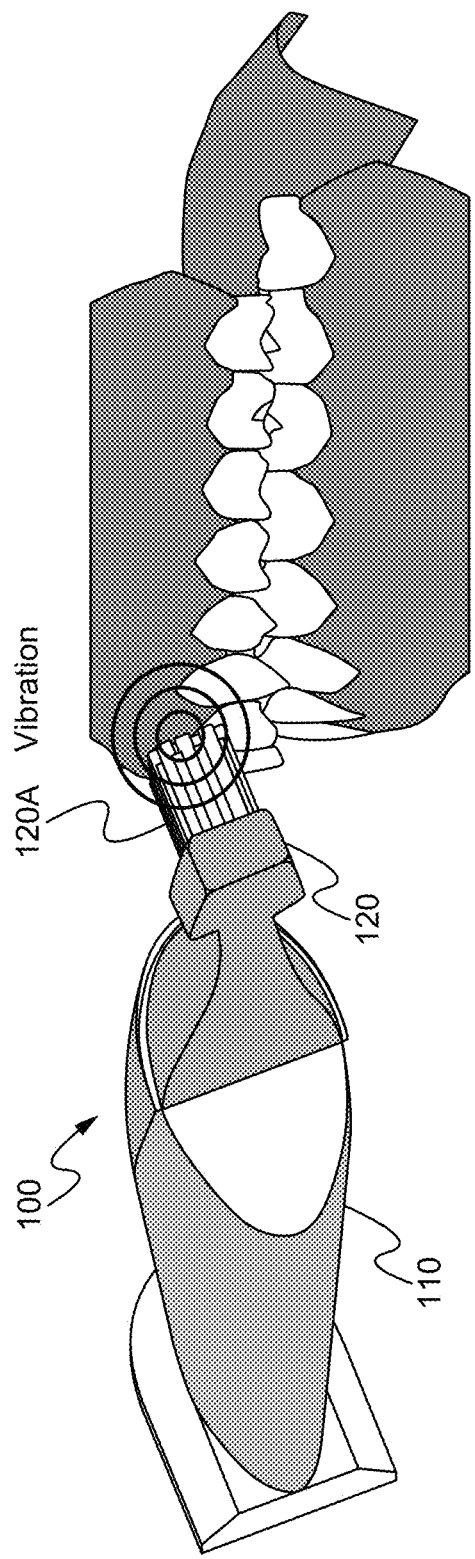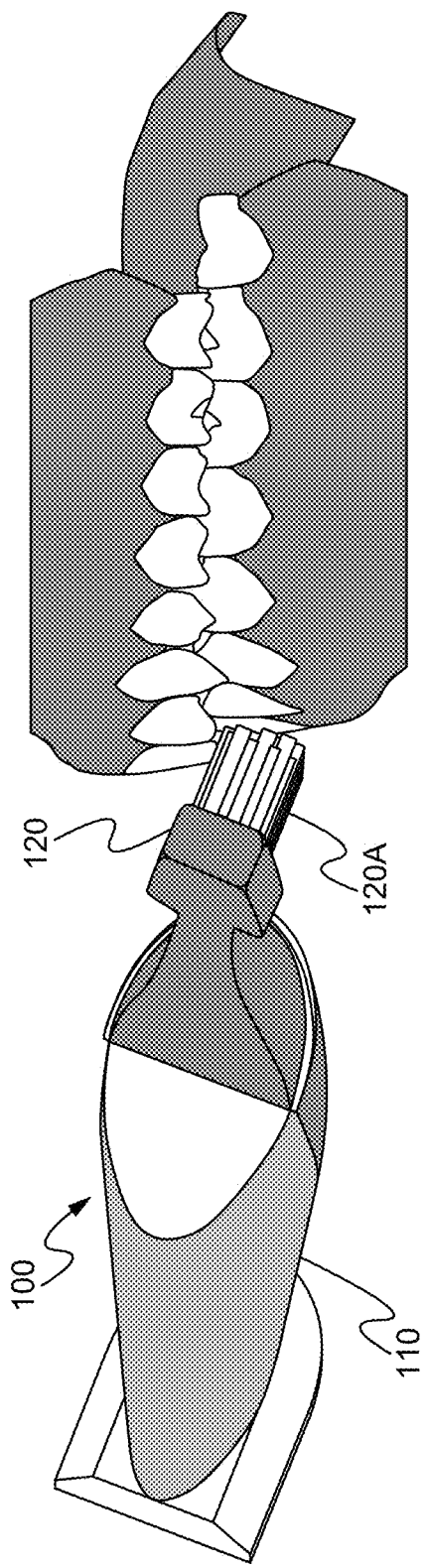

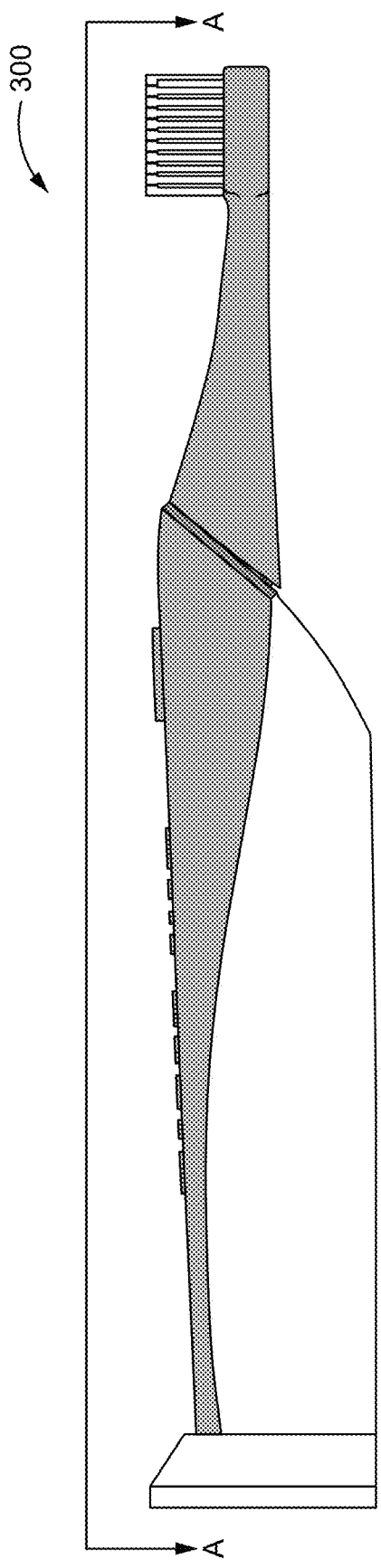
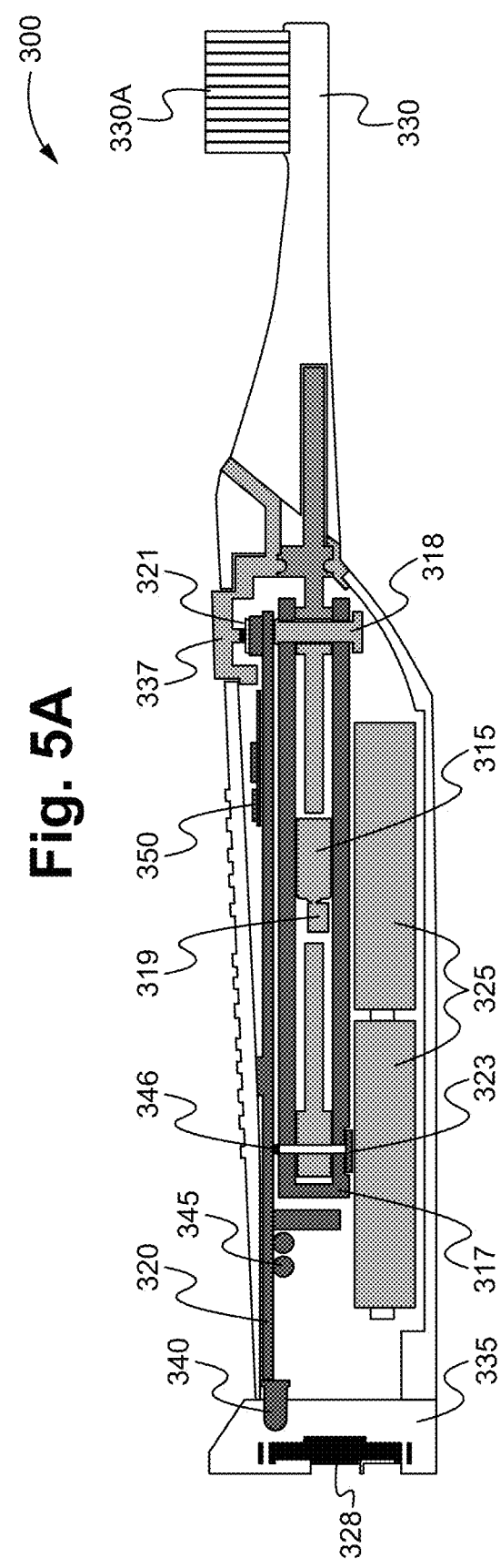
Fig. 5A
Fig. 5B

ISOLATED PIVOTING BAR-OSCILLATING TOOTH BRUSH WITH DENTA-HAPTIC FEEDBACK

RELATED APPLICATION(S)

This application claims priority under 35 U.S.C. § 119(e) of the U.S. Provisional Patent Application Ser. No. 62/650,936, filed Mar. 30, 2018, and titled "Isolated Pivoting Bar Oscillating Tooth Brush with Denta-Haptic Feedback," which is hereby incorporated by reference in its entirety.

FIELD OF THE INVENTION

This invention is related to tooth brushes. More specifically, this invention is related to tooth brushes that provide user feedback on proper brushing technique to ensure adequate teeth and gum cleaning.

BACKGROUND OF THE INVENTION

Though most people brush their teeth regularly, many do not use a proper brushing technique. This can result in inadequate cleaning of the tooth surface, leading to tooth decay, receding gum lines, stained teeth, and other damage to teeth and gums. Once young children develop these bad brushing habits, these habits are hard to break. Even worse, some young children do not brush at all.

What is needed is a system and method of encouraging brushing and teaching proper brushing technique in a manner that is easily understandable by children and grown-ups alike, and that encourages proper brushing.

SUMMARY OF THE INVENTION

A tooth brush in accordance with the principles of the invention provides a user with tactile reinforcement that they are brushing or brushing correctly. For young users, the tooth brush can be configured to provide positive feedback when the user brushes. In other embodiments, the user receives positive feedback when she brushes "correctly." The tooth brush can be configured to provide feedback tailored to particular users, for example by activating gaming content, for young users, or by playing music or talk shows, for older users. Preferably, the feedback is generated on the tooth brush itself.

In one embodiment, the tooth brush noticeably vibrates when the user brushes according to a correct or "target" brushing technique. The vibrations are sensed by the user's hands, as well as the teeth and gums. The correct brushing technique can include brushing in small circular motions, brushing in the correct quadrant of the mouth for a given time, brushing at a 45 degree angle to the tooth surface, and using neither too much nor too little pressure on the teeth, to name only a few criteria. If the user stops using a correct brushing technique, the tooth brush stops vibrating. Alternatively, or additionally, the user is alerted that she is using an incorrect technique in some other, easily recognizable manner, such as an audio signal.

Preferably, the head of the tooth brush, including the bristles, vibrates. The vibration of the tooth brush bristles has the additional advantage of amplifying the cleaning benefits to the user's teeth. In one embodiment, the construction of the tooth brush puts the maximum vibration to the brush head by isolating the tooth brush's motor from its housing by a pivoting bar. Most of the vibration is transmitted to the user's teeth, which are sensitive to such vibrations.

Preferably, the haptic feedback reinforces the user correctly brushing in small circles, know as the Bass Technique, which is proven to be almost 3 times more effective at removing dental plaque than other techniques. Of course, the tooth brush can be configured so that a correct brushing technique conforms to other brushing techniques.

In a first aspect, a method of monitoring brushing of a surface includes sensing brushing relative to a surface during a brushing session and generating feedback in response to the brushing. In one embodiment, the brushing includes a brushing technique, and the feedback corresponds to a deviation between the brushing technique and a target brushing technique. Preferably, the brushing technique includes any combination of an orientation, a pattern, a pressure, a cadence, and a location of brush bristles relative to the surface. Preferably, the surface includes teeth and gums, though other surfaces can also be brushed. Preferably, the target brushing technique substantially conforms to a Bass Technique.

In one embodiment, the feedback includes an interruption or reduction of a vibration transmitted to the brush bristles. Alternatively, or additionally, the feedback includes generating, interrupting, or varying content, an audio signal, an optical signal, or any combination thereof. In one embodiment, the location corresponds to a quadrant of the surface, such as a quadrant in a user's mouth. The method also includes selecting a quadrant of the surface to brush, where the target brushing technique is based on the selected quadrant. For example, in one quadrant, a proper brushing technique includes small circular motions, while in another quadrant the proper technique includes small up-and-down or side-to-side motions.

In a second aspect, an integrated tooth brush system includes a brush head containing bristles, a sensor configured to sense a movement between the brush head relative to a tooth surface, and a processor configured to generate feedback in response to the movement. In one embodiment, the movement includes a deviation between a motion of the brush head relative to the tooth surface and a target motion. In one embodiment, the sensor includes a pivot bar coupled to the brush head. The pivot bar is configured to sense a deviation between the motion of the brush head relative to a tooth surface and the target motion. The feedback includes activating content presented to a user. Preferably, the content is adapted to a user.

In one embodiment, the feedback includes interrupting or reducing a vibration of the brush head, and thus the bristles. Preferably, the target motion substantially conforms to a Bass Technique.

In one embodiment, the system also includes a motor coupled to the brush head. In one embodiment, the motor is coupled to the handle and transmits vibrations to the brush head via a pivot on the pivot bar. In another embodiment, the motor is mounted to the pivot bar. The motor vibrates the bristles with a magnitude inversely proportional to the deviation. The vibration causes a micro-scrubbing action to remove plaque from the tooth surface. The motor includes a shaft having an end, the end coupled to an eccentric weight, such that spinning the eccentric weight causes the vibration. The pivot bar contains one or more apertures. The system also includes a light source and a light sensor arranged on opposite sides of the pivot bar, such that an amount of light from the light source through the one or more apertures impinging on the light sensor indicates a magnitude of a deflection of the brush head with respect to the tooth surface. In one embodiment, the light source includes a light emitting diode.

The system also includes a housing that encloses the pivot bar, the motor, the shaft, the eccentric weight, the light source, the light sensor, a rechargeable battery, and a frame, with the pivot bar coupled to the frame by a pivot pin.

The housing includes a front case and a back case. The frame is fixed to the front case and the back case with overmold to form a waterproof handle suitable for a user to hold.

In one embodiment, the housing also includes a housing base including a color-changing LED speaker configured to generate any combination of color patterns corresponding to the magnitude of the deviation.

In one embodiment, the system also includes a charging base configured to support the housing base. The housing base includes a charging coil, which includes a proximity charging coil adapted to wirelessly charge the rechargeable battery.

The handle also encloses a wireless transceiver coupled to the processor. The charging base and the housing base are configured to wirelessly communicate with each other.

Preferably, the charging base forms a smart home audio hub configured to provide audio communication between the charging base and online services.

In still another embodiment, the motor is mounted on the handle and transmits vibrations to the brush head through the pivot.

BRIEF DESCRIPTION OF THE DRAWINGS

FIGS. 1A-B illustrate a tooth brush in accordance with one embodiment of the invention, showing, respectively, a bristle head vibrating during correct brushing and not vibrating during incorrect brushing.

FIGS. 5A and 5B are a side view and a side cross-sectional view, respectively, of the tooth brush of FIG. 3.

DETAILED DESCRIPTION OF THE INVENTION

Figure 2:
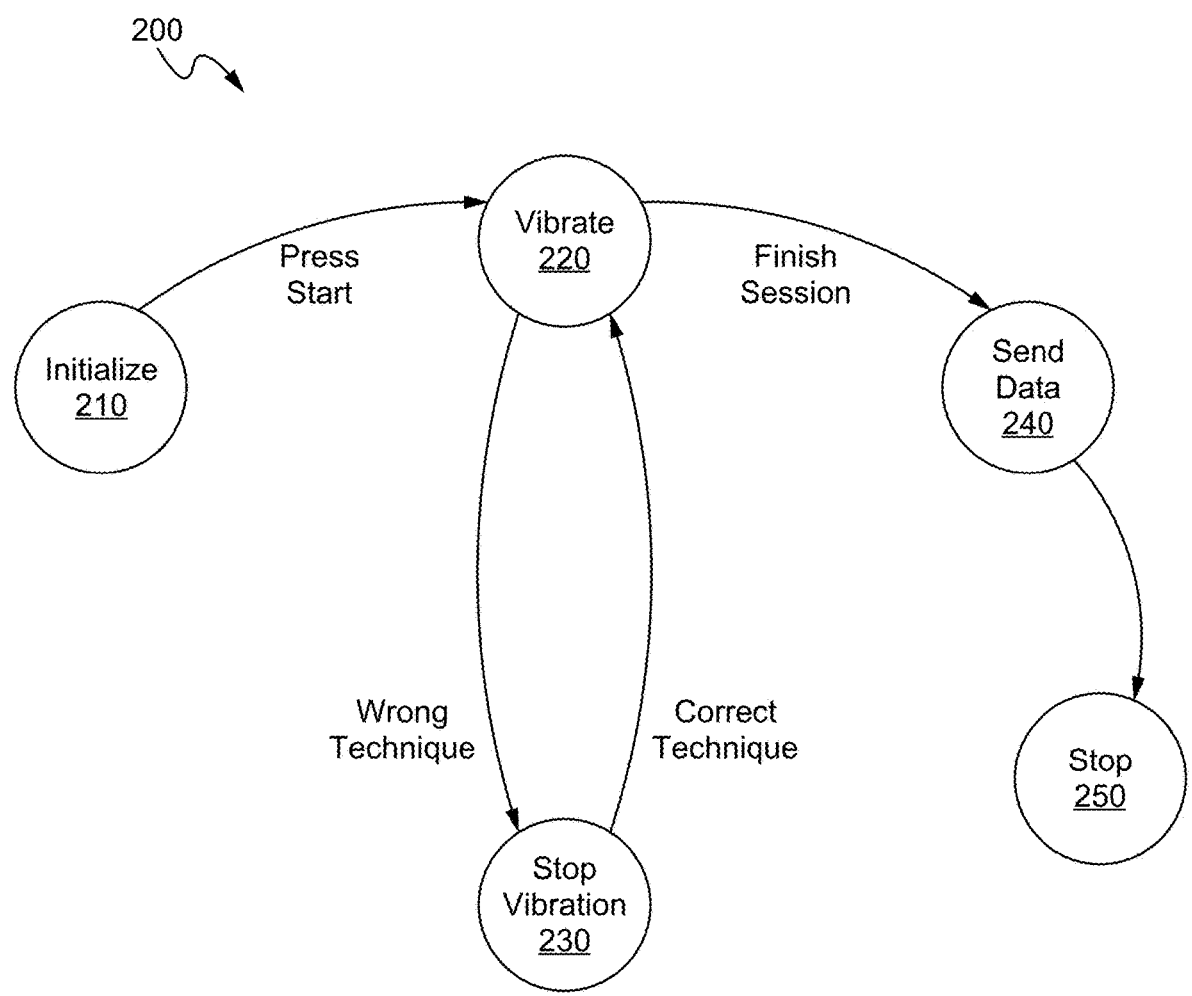
FIG. 2 is a state diagram implementing a method of monitoring a user's brushing technique and applying feedback in accordance with one embodiment of the invention.

A tooth brush in accordance with the principles of the invention teaches and encourages a user to brush, preferably correctly and efficiently. The tooth brush rewards the user with vibrations, sounds, or both while brushing and, in some embodiments, to indicate correct motion, pattern and cadence. The vibrations further aid in cleaning and plaque removal.

For young users, for whom brushing itself is to be rewarded, movement of the tooth brush generates feedback, such as lights and sounds, or activates content, such as games and other applications. In accordance with the principles of the invention, other suitable feedback can be generated, which users find enjoyable and will encourage not only proper brushing but, for young children, any brushing.

FIGS. 1A and 1B show a tooth brush 100 configured in accordance with the principles of the invention. The tooth brush 100 includes a handle 110 coupled to a brush head 120 containing bristles 120A. The tooth brush 100 has been initialized to recognize a particular "correct" tooth brushing technique, such as the Bass Technique, the modified Bass Technique, or similar techniques that encourage brushing to interact with content, and to alert the user when she deviates from the correct technique. When the user uses a correct brushing technique, the bristles 120A vibrate, enhancing teeth cleaning. When the user uses an incorrect technique, such as side-to-side brushing using long strokes, the bristles 120A stop vibrating.

FIG. 1A shows a user using a correct brushing technique. Here, in this part of her brushing session, she is correctly brushing in an upper quadrant of the mouth, so the bristles 120A vibrate. In FIG. 1B, however, the user is using an incorrect technique by brushing in one of the lower quadrants of her mouth. The user may be brushing in this quadrant for the third time in this tooth brushing session, neglecting other quadrants. In this instance, the bristles 120A stop vibrating, alerting the user in an easily understandable manner that she is not using a proper brushing technique. The user may thus proceed to brush other, neglected quadrants of her mouth. In this example, once she begins brushing in the correct quadrant, the bristles 120A will resume vibrating.

With the Bass Technique, a user positions a tooth brush on the tooth at a 45° angle and makes small circular motions. At the gum line, the user inserts the brush at the same 45° angle between the tooth and gums, below the gum line, and wiggles the brush back and forth. She does this for each tooth so that the entire surfaces of each tooth, front and back, including below the gum lines, are brushed.

While FIG. 1B illustrates alerting a user that she is neglecting brushing all of her teeth and specific gum areas, she may be receive feedback for other improper brushing techniques:

Brushing with the bristles engaging the teeth at angles other than 45 degrees.

Brushing in non-circular motions, such as side to side.

Brushing in large circular motions.

Neglecting to brush in all areas of the mouth.

Not brushing each tooth for a sufficient time.

Brushing teeth with too soft or too hard a pressure.

Not brushing both the inner and outer surfaces of each tooth.

These improper techniques are only exemplary. After reading this disclosure, those skilled in the art will recognize other improper techniques for which a used can receive feedback. Also, as explained below, a user can be receive feedback in other formats, such as an audio message, an audio signal, such as a chirp, a flashing light, interrupting a song or program from the device, a radio, or other source, to name only a few such feedback.

As described in more detail below, a tooth brush in accordance with the principles of the invention can include many different features, such as LED speakers, a module to receive, process and display brushing data, such as to track a child's brushing improvement, wireless communications between the tooth brush and online services systems, and entertainment services, to name only a few possible features.

FIG. 2 is a state diagram 200 for a tooth brushing system, such as one including the tooth brush 100, in accordance with one embodiment of the invention. In the state 210, a tooth brushing system is initialized with a "correct" brushing technique. The user's brushing technique is tracked against this correct brushing technique to determine when the user's technique deviates from the proper technique so that corresponding feedback can be generated. The user presses a START button, and the state 215 is entered. The user now places the bristles 120A against her teeth and begins the brushing technique. The bristles 120A vibrate. The tooth brush 100 now senses the motion of the bristles 120A against the teeth surface and compares the motion to the motions of the correct technique. As described in more detail below, preferably the tooth brush 100 includes elements used to determine an angle of the bristles 110A against the teeth surfaces, the pressure of the bristles 110A against the surfaces, the sequence of brushing in each quadrant (e.g., in quadrant 1, the third molar was brushed, followed by the second molar, so the first molar is next), to name only a few variables to track. If, during the brushing session, the user uses an incorrect technique, the system enters the state 230, in which the vibration stops. When the user resumes the correct brushing technique, the state 220 is reentered, and the vibration resumes. When the system determines that the entire mouth has been brushed according to the proper technique, the optional state 240 is entered. In the state 240, data related to the brushing session is stored and processed on the system or transmitted to a remote device for processing. As one example, the data record how well a user is brushing, that is, how the brushing corresponds to the correct brushing technique. In this way, brushing techniques of children can be tracked and monitored and improvement recognized. From the state 240, the STOP state 250 is entered.

Preferably, the state diagram 200 is implemented as a software module on the tooth brushing system. In other embodiments, the state diagram 200 is implemented in firmware or any other suitable means.

It will be appreciated that the state diagram 200 is only illustrative. In other embodiments, states can be added, deleted, and their sequences changed.

Figure 3:
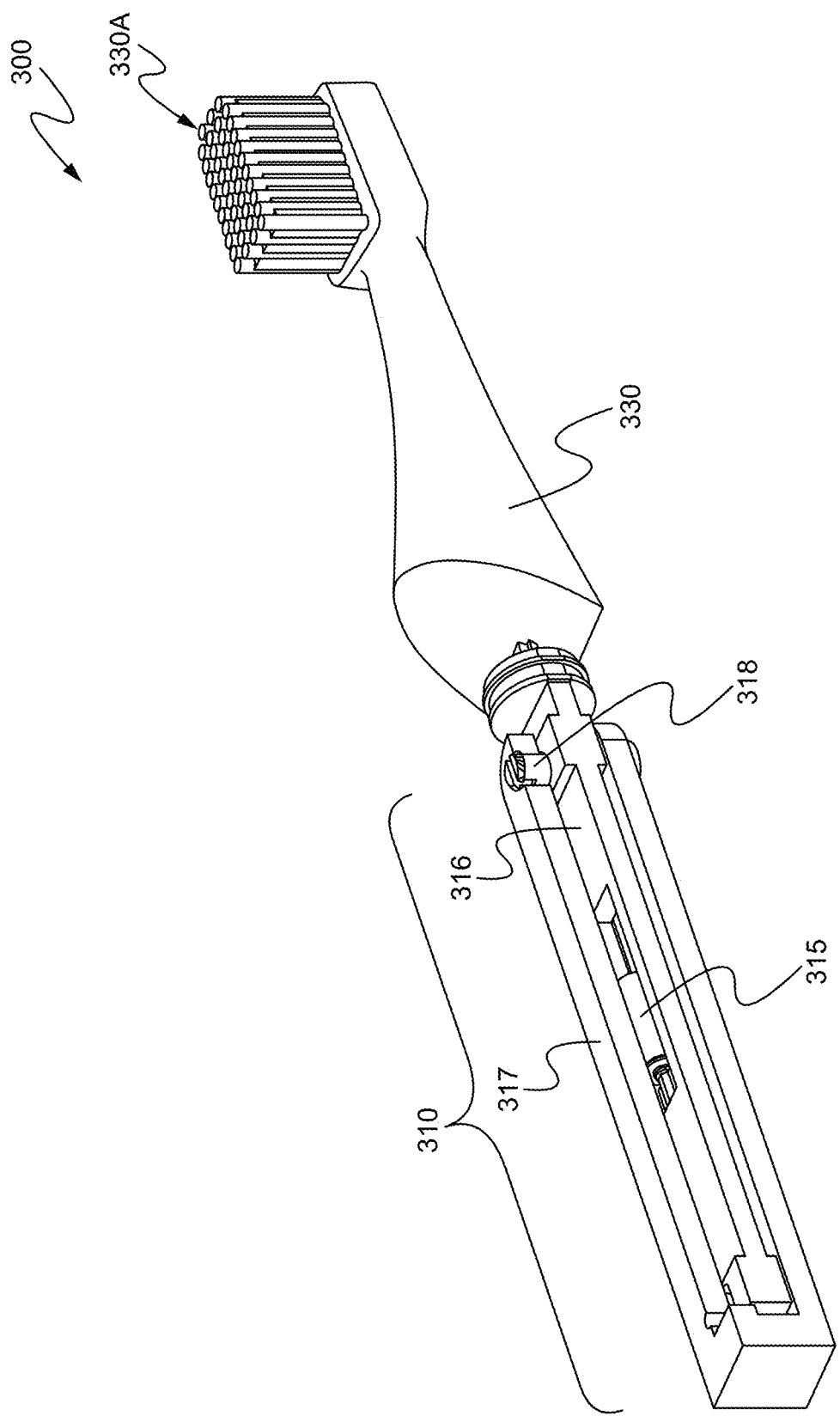
FIG. 3 shows a tooth brush in accordance with one embodiment of the invention.

FIG. 3 shows a tooth brush 300 in accordance with one embodiment of the invention. The tooth brush 300 includes a housing 310 enclosing a motor 315 and a pivot bar 316 pivotally coupled to a frame 317 with a pivot pin 318. The motor 315 has a shaft terminated at one end by a spinnable eccentric weight 319. The pivot bar 316 is coupled to a brush head 330. Preferably, the brush head 330 is replaceable.

Figure 4:
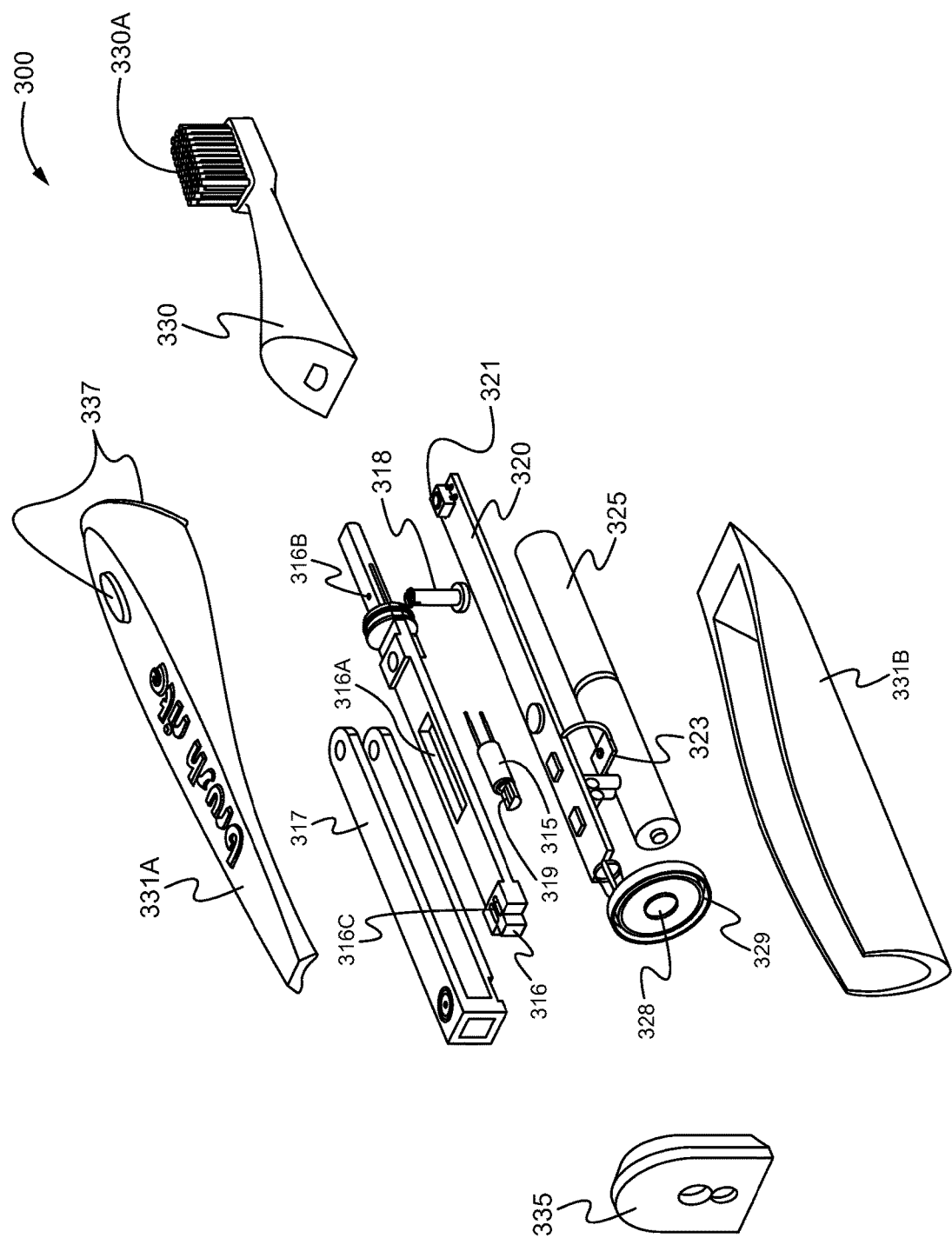
FIG. 4 is an exploded view of the tooth brush of FIG. 3.

FIG. 4 is an exploded view of the tooth brush 300. As shown in FIG. 4, the tooth brush 300 includes the brush head 330, the motor 315, the frame 317, and the pivot bar 316. The pivot bar 316 has a slot 316A for receiving and securing the motor 315, a pivot hole 316B, and a light aperture 316C. The pivot pin 318 pivotally secures the pivot bar 316 to the frame 317 through the pivot hole 316B. A primary printed circuit board (PCB) 320 includes a processor and storage (not shown) for implementing the processes of the invention, such as those in the state diagram 200, and a START/ ON switch 321. An LED PCB, with wires, 323 is sandwiched between a battery 325 and the frame 317. In one embodiment, the battery 325 is rechargeable. A speaker 328 and charge coil 329 are operatively coupled to the primary PCB 320. A front case 331A and a back case 331B enclose the primary PCB 320 and the battery 325. An illuminating base 335 fits over the ends of the front case 331A and back case 331B to seal one end of the tooth brush 300. The frame 317 is fixed to the front case 331A and the back case 331B with overmold to form a waterproof handle for a user to hold.

Preferably, the components of the tooth brush 300, including, for example, the brush head 330 with bristles, motor 315, pivot bar 316, frame 317, primary PCB 320, front case 331A and back case 331B, are integrated into a single component.

FIG. 5A is a side view of the tooth brush 300, and FIG. 5B is a side cross-sectional view of the tooth brush of FIG. 5A along the line A-A in FIG. 5A. Including the elements already described in FIG. 4, the tooth brush 300 also includes an Effects LED 340, a position sensor 345, a light sensor 346, a wireless chip 350, and a button cap and seal 337 covering the switch 321. The primary PCB 320 is operatively coupled to the motor 315, the Effects LED 340, the position sensor 345, the light sensor 346, the wireless chip 350, and the switch 321.

The arrangement of the pivot bar 316 and the light sensor 346 allows the system to use the motion of the pivot bar 316 to measure the motion and frequency of brushing. In this arrangement, the pivot bar 316 is selectively sensitive to the motion of correct brushing, small vertical circular motions. As shown in FIG. 5, the light aperture 316C on the pivot bar is aligned with the LED 323 and the light sensor 346, such that when the brush head 330 and thus the pivot bar 316 moves, the alignment of the light aperture 316C, the LED 323, and the light sensor 346 is changed, varying the amount of light from the LED 323 impinging on the light sensor 346. The magnitude of this light corresponds, among other things, to the radius of the brushing (e.g., small circles, in accordance with the Bass Technique or large circles that deviate from the Bass Technique), to the angles of the bristles 330A against a tooth surface, or a combination of both. This magnitude and other characteristics of the impinging light can be used to determine whether the user is brushing with small circular strokes and at the correct brushing angle, in accordance with a correct brushing technique, or she is not. By detecting a brushing radius, the system can also determine that the user has started brushing, and that a brushing technique should be monitored.

In a similar manner, the position sensor 345 indicates the location of the bristles relative to the teeth, allowing the system to track which mouth quadrant the user is currently brushing in, more specifically, which teeth have been brushed, the pressure against the teeth, and the brushing motion (e.g., circular vs. side-to-side motions, etc.).

For ease of reference, the combination including the pivot bar 316 with light aperture 316C, the LED 323, the light sensor 346, the position sensor 345, and the processor on the primary PCB 320 are referred to as the "tracking" module. The processor on the primary PCB 320 analyzes motion data from the other components of the tracking module to determine what motor vibrations to make.

Referring to FIGS. 2 and 5B, in operation, computer-implemented instructions and data corresponding to a proper brushing technique are loaded into the memory (not shown) on the tooth brush 300. In one embodiment, the instructions include those corresponding to the state diagram 200. The user presses the START/ON switch 321. The bristles 330A vibrate. The tooth brush 300 tracks the motion using the tracking module. When the user deviates from a proper brushing technique, the bristles 330A stop vibrating. Alternatively, or additionally, the Effects LED 340 illuminates, the speaker coil 328 transmits an audio signal, or both according to a pattern to alert the user that her brushing technique is improper.

In one embodiment, a tooth brush in accordance with the principles of the invention creates vibrations by directing the mechanical energy created by a spinning eccentric weight located on the end of a motor shaft that is fixed to a pivot bar, such as the pivot bar 316 of FIG. 4. As shown in FIG. 4, the pivot bar 316 is coupled to a frame 317 through the pivot pin 318. The pivot bar 316 is substantially coupled to the brush head 330, to which most of the energy is transmitted.

In still another embodiment, the motor 315 is mounted on the handle and transmits vibrations to the brush head 330 via the pivot pin 318.

While the examples show a pivot bar, it will be appreciated that in other embodiments vibrations can be generated and transmitted using other means including accelerometers, pressures sensors. Similarly, in other embodiments, the sensing means can be electrical, electronic, or electromechanical, to name a few examples, such as springs and ball switches.

Figure 6:
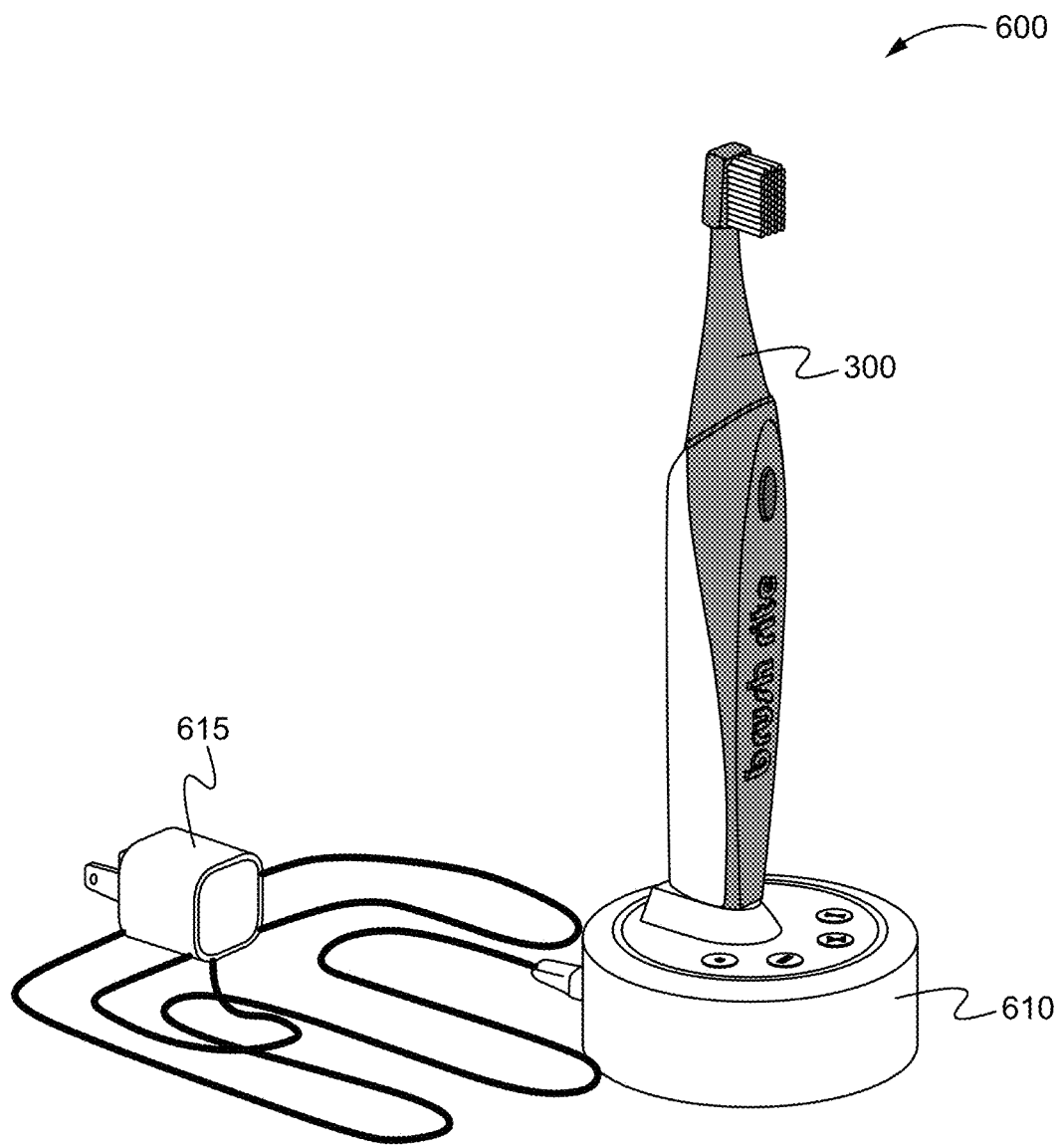
FIG. 6 shows the tooth brush of FIG. 3 supported in a smart holder and a charger in accordance with one embodiment of the invention.

FIG. 6 shows a tooth brushing system 600 in accordance with one embodiment of the invention. The tooth brushing system 600 includes the tooth brush 300, a base unit 610 that includes a waterproof audio home device having a charger for the tooth brush 300, and a wall plug 615. The base unit 610 contains a proximity charging coil that is powered from the wall plug 615. The charging base unit 610 is configured to also be a smart home audio hub, whereby vocalized audio communications between the user and on line services can take place. In addition, the charging base unit 610 contains a wireless communications chip (not shown) that interfaces with the wireless chip 350 on the tooth brush 300. This permits the collection of brushing data for efficacy and entertainment purposes.

In one embodiment, the charging base unit 610 includes a smart home speaker linked to the Internet. This allows user brushing activity to be monitored and corresponding data transmitted to a remote device for storage and analysis. In one embodiment, the charging base unit 610 is also capable of delivering audio content to the tooth brush 300 to supplement the brushing experience of the user.

It will be appreciated that embodiments of the invention are able to be configured based on the particular user. For example, some embodiments can be adapted to reward young users for merely brushing. In these embodiments, moving the tooth brush activates content by presenting lights, sound (e.g., music, jingles, etc.), games, and other applications, to name only a few examples. In other embodiments, the tooth brush is configured to reward correct brushing, again by presenting similar or other rewards. In some embodiments, the reward is adapted to the user, for example, jingles and gaming content for young users, more mature music or a radio talk-show program for older users. Preferably, the tooth brush is easily configurable so that a single tooth brush can be configured for different users.

While embodiments of the invention describe tooth brushes, it will appreciated that the principles of the invention can be used with brushing surfaces other and teeth and gums.

It will be readily apparent to one skilled in the art that various other modifications may be made to the embodiments without departing from the spirit and scope of the invention as defined by the appended claims.

What is claimed is:

1. An integrated tooth brush system comprising:
    a brush head containing bristles;
    a sensor configured to sense a movement of the brush head relative to a tooth surface; and
    a processor configured to generate feedback in response to the movement, wherein the feedback comprises interrupting a vibration of the bristles.

2. The tooth brush system of claim 1, wherein the movement comprises a deviation between a motion of the brush head relative to the tooth surface and a target motion.

3. The tooth brush system of claim 2, wherein the sensor comprises a pivot bar coupled to the brush head, the pivot bar configured to sense the deviation between a motion of the brush head relative to a tooth surface and a target motion.

4. The tooth brush system of claim 3, further comprising a motor coupled to the brush head, wherein the motor vibrates the bristles with a magnitude inversely proportional to the magnitude of the deviation.

5. The tooth brush system of claim 4, further comprising a handle, wherein the motor is coupled to the handle and transmits vibrations to the brush head via a pivot on the pivot bar.

6. The tooth brush system of claim 1, wherein the feedback further comprises activating content presented to a user.

7. The tooth brush system of claim 6, wherein the content is adapted to the user.

8. The tooth brush system of claim 2, wherein the target motion substantially conforms to a Bass Technique.

9. The tooth brush system of claim 3, wherein the pivot bar contains one or more apertures, the tooth brush system further comprising a light source and a light sensor arranged on opposite sides of the pivot bar, such that an amount of light from the light source through the one or more apertures impinging on the light sensor indicates a magnitude of a deflection of the brush head with respect to the tooth surface.

10. The tooth brush system of claim 9, wherein the light source comprises a light emitting diode.

11. The tooth brush system of claim 10, further comprising a housing, wherein the housing encloses the pivot bar, the motor, the shaft, an eccentric weight, the light source, the light sensor, a rechargeable battery, and a frame, the pivot bar coupled to the frame by a pivot pin.

12. The tooth brush system of claim 11, wherein the housing comprises a front case and a back case, the frame fixed to the front case and the back case with overmold to form a waterproof handle suitable for a user to hold.

13. The tooth brush system of claim 12, wherein the housing further comprises a housing base comprising a color-changing LED speaker configured to generate any combination of color patterns corresponding to the magnitude of the deviation.

14. The tooth brush system of claim 13, further comprising a charging base configured to support the housing base.

15. The tooth brush system of claim 14, wherein the housing base comprises a charging coil.

16. The tooth brush system of claim 15, wherein the charging coil comprises a proximity charging coil adapted to wirelessly charge the rechargeable battery.

17. The tooth brush system of claim 12, wherein the handle further encloses a wireless transceiver coupled to the processor.

18. The tooth brush system of claim 12, wherein the charging base and the housing base are configured to wirelessly communicate with each other.

19. The tooth brush system of claim 14, wherein the charging base forms a smart home audio hub configured to provide audio communication between the charging base and online services.

20. The tooth brush system of claim 4, wherein the motor is mounted to the pivot bar.

21. The tooth brush system of claim 4, wherein the motor comprises a shaft having an end, the end coupled to an eccentric weight, such that spinning the eccentric weight causes the vibration of the bristles.

22. An integrated tooth brush system comprising:
- a brush head containing bristles;
- a sensor configured to sense deviations between a movement of the brush head relative to a tooth surface and a target movement of the brush head relative to the tooth surface; and
- a processor configured to generate feedback corresponding to magnitudes of the deviations, wherein different feedback indicate different deviations from a proper brushing technique.

23. The tooth brush system of claim 22, wherein the feedback comprises combinations of color patterns, each combination corresponding to a magnitude of a deviation.

24. The tooth brush system of claim 23, further comprising an LED speaker comprising multiple LEDs configured to generate the combinations of color patterns.

25. The tooth brush system of claim 22, further comprising a motor for vibrating the bristles to clean the tooth surface.

26. The tooth brush system of claim 25, wherein the feedback comprises vibrating the bristles at different speeds along the tooth surface, the speeds inversely proportional to the magnitudes of the deviations.

27. The tooth brush system of claim 22, wherein the target movement comprises a brushing technique.

28. The tooth brush system of claim 27, wherein the brushing technique comprises any combination of an orientation, a pattern, a pressure, a cadence, and a location of the bristles relative to the tooth surface.

29. The tooth brush system of claim 22, wherein the sensor comprises a pivot bar coupled to the brush head, the pivot bar configured to sense the deviation between a motion of the brush head relative to a tooth surface and a target motion.

* * * * *